United States Patent
McDowall et al.

(10) Patent No.: US 7,948,127 B2
(45) Date of Patent: May 24, 2011

(54) CONNECTION METHOD FOR ROTATING RECTIFIERS ON A GENERATOR

(75) Inventors: Gregor McDowall, Phoenix, AZ (US); Simon Waddell, Oro Valley, AZ (US); David Kane, Tucson, AZ (US); William Scherzinger, Oro Valley, AZ (US); Michael Duddeck, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 272 days.

(21) Appl. No.: 12/271,754

(22) Filed: Nov. 14, 2008

(65) Prior Publication Data

US 2010/0123360 A1 May 20, 2010

(51) Int. Cl.
*H02K 11/04* (2006.01)
*H02M 1/00* (2007.01)

(52) U.S. Cl. ............... 310/68 D; 310/231; 363/145
(58) Field of Classification Search ............ 310/68 D, 310/71; 363/145, 107–108
See application file for complete search history.

(56) References Cited

U.S. PATENT DOCUMENTS

| | | | |
|---|---|---|---|
| 3,739,209 A * | 6/1973 | Drabik | ............... 310/64 |
| 4,570,094 A | 2/1986 | Trommer | |
| 4,581,695 A | 4/1986 | Hoppe | |
| 4,603,344 A | 7/1986 | Trommer | |
| 4,628,219 A | 12/1986 | Troscinski | |
| 4,987,328 A | 1/1991 | Shahamat | |
| 5,001,376 A | 3/1991 | Iseman | |
| 5,012,145 A | 4/1991 | Franz et al. | |
| 6,661,135 B2 | 12/2003 | Borden et al. | |
| 6,859,019 B2 * | 2/2005 | Tornquist et al. | ............... 322/68 |
| 6,903,470 B2 * | 6/2005 | Doherty et al. | ............... 310/59 |
| 7,256,511 B2 | 8/2007 | Tamura et al. | |
| 7,511,392 B2 * | 3/2009 | Rubbo et al. | ............... 310/68 D |
| 2006/0163957 A1 | 7/2006 | Johnsen | |
| 2006/0176720 A1 | 8/2006 | Lemmers et al. | |
| 2007/0108854 A1 | 5/2007 | Osborn et al. | |

FOREIGN PATENT DOCUMENTS

| | | |
|---|---|---|
| WO | WO9100640 | 1/1991 |
| WO | WO2008005169 | 1/2008 |

* cited by examiner

*Primary Examiner* — Burton Mullins
(74) *Attorney, Agent, or Firm* — Oral Caglar, Esq.

(57) ABSTRACT

An annular bus ring assembly for connecting main rotor windings of a generator to the exciter diodes includes a plurality of annular bus rings with tabs bent over forming plurality of pads mounted on either side of a dielectric hub. The pads of annular bus rings clocked at an angle to each other to generate a pattern of plurality of pads on a equal angle spacing on a diameter to connect to the diodes by wire rope leads and a pattern of two connection at 90° spacing to connect to main generator leads.

20 Claims, 6 Drawing Sheets

CONNECTION METHOD FOR ROTATING RECTIFIERS ON A GENERATOR

BACKGROUND OF THE INVENTION

The present invention generally relates to power generation systems and, more particularly, to systems and methods for connecting the rotating rectifier on a generator or motor.

The electrical machines used in aerospace power generation systems operate at very high speed. It is therefore desirable to make the generators used in these systems brushless, to avoid frequent maintenance or replacement. Brushless generators also help in controlling the noise made by brushes. Moreover, transients may be introduced by the brushes into the current may interfere with the proper operation of electrical loads.

A typical brushless generator has three distinct generating systems—a permanent magnet generator, an exciter and a main generator. The permanent magnet generator includes rotatable permanent magnets for establishing a magnetic field that induces alternating current that is typically fed to a regulator or a control device. The regulator or control device outputs a direct current signal and stationary field windings of the exciter are electrically coupled to receive the direct current signal output from the regulator or control device and develop a magnetic field in the exciter. The exciter may also include exciter armature windings mounted on the generator rotor, which rotate within this magnetic field.

The magnetic field in the exciter is in turn employed to induce an even higher level of current. Typically, the exciter armature windings are wound such that the induced alternating current signal is a three-phase alternating current signal.

Rectifier circuits that rotate with the exciter armature windings rectify the three-phase alternating current signal induced in the exciter armature windings. The direct current output from the rectifiers is provided to the main generator. Typically, conversion from three phase alternating current to direct current in a generator is accomplished using a full wave bridge as disclosed in U.S. patent application no. 20070108854 by Osborne et al.

In a typical full wave bridge connection, an extension of the flat copper wire is brought into the axial vicinity of the exciter from the main coil. Six separate stranded leads may be brazed in a common connection to the flat wire. These leads are then brought out radially around the exciter rotor core spokes as flying leads and terminated on the diodes. This results in a complex set of connections linking six diodes to two main rotor leads of the generator, which is susceptible to damage from the high centrifugal loading present on a rotor, especially, in aircraft applications that typically rotate at relatively high speeds (e.g., 24,000 r.p.m. or greater). The complex set of connections is also susceptible to shorting and must be electrically insulated to prevent shorting of the electrical machine.

The main generator includes rotating field windings and stationary armature windings. The rotating field windings are electrically coupled to receive the DC current from the rectifiers and develop a magnetic field that rotates with the rotor. This rotating magnetic field further induces a three-phase AC current in the stationary armature windings. This three-phase AC current is then provided to a load.

Typically in a brushless generator, in order to generate a suitable magnetic field in the rotor, it is necessary to utilize direct current as opposed to alternating current. Since the output of the exciter is an alternating current, it is desirable that this alternating current must be rectified by a rectifier to direct current. To avoid resorting to brushes, it is desirable that the rectifier assembly interconnecting the exciter armature windings and the main generator rotating field winding be carried by the rotor of the generator. It is necessary that such rectifier should also be capable of withstanding high centrifugal loading. U.S. Pat. Nos. 4,570,094; 4,603,344 and 4,628,219 disclose examples of known rotating rectifier assemblies.

A separate wound resistor in its own unique bobbin assembly may be glued to the shaft and the end of the resistor wire terminates in the same common braze as the diode leads. All these operations are carried out at the assembly level of the rotor and any mistake can lead to reworking or scrapping of the device.

U.S. Pat. No. 4,570,094 issued to Trommer, discloses a rectifier assembly where the diode wafers are angularly spaced in two parallel planes. The diodes are sandwiched between conductor plates which are held under compression by a biasing device to assure good electrical contact between the various components. But it relied on clamping forces in order to maintain electrical contact. Similarly U.S. Pat. No. 4,603,344 issued to Trommer relies on means for applying a compressive pressure to bring elements and wafers into good thermal and electrical contact. It also relied on applying a compressive pressure in order to maintain thermal and electrical contact.

U.S. Pat. No. 4,581,695 issued to Hoppe, discloses rectifier assembly that included two side-by-side conductive blocks, each having three outwardly facing diode receiving surfaces. A diode is positioned on each surface and three phase bars are used to connect aligned diodes for each of the two blocks. A metal housing is shrink fitted using thermograding to hold the structure in assembled relation. Therefore, this assembly could not be repaired without destroying the housing.

As can be seen, there is a need for a system and method for connecting main rotor winding to the exciter diodes that can withstand high centrifugal loads present on a rotor and provides an impeccable connection to preventing shortening of machine, can be tested and assembled outside before inclusion to the rotor and does not add size and cost of the power generating system.

SUMMARY OF THE INVENTION

In one aspect of the present invention, an annular bus ring assembly for connecting main rotor windings of a generator to exciter diodes comprises a plurality of annular bus rings with tabs bent over forming a plurality of pads; a dielectric hub having castellations to support the plurality of annular bus rings, the castellations aligning with annular bus rings pads; said annular bus rings mounted on the dielectric hub and pads of annular bus rings spaced apart on the dielectric hub at an equal angle to each other and a pattern of two leads at 90° spacing to each other and a plurality of wire rope leads connecting the pads of the annular bus ring assembly to the diodes.

In another aspect of the invention, a power generating system, comprises an outer supporting ring enclosing an annular bus ring assembly; the annular bus ring assembly connecting main rotor windings of generator to the exciter diodes and having a dielectric hub configured with castellations to support a plurality of annular bus rings with tabs bent over forming a plurality of tabs; the annular bus rings mounted on the dielectric hub and pads of the annular bus rings aligned about the dielectric hub at an equal angle spacing to each other and a pattern of two leads at 90° to each other connecting to the main generator lead; three anode diodes connected to plurality of pads of one or more annular bus rings and three cathode diodes connected to plurality of pads of one or more annular bus rings by a plurality of braided wire rope leads.

In another aspect of the invention, a method of connecting main rotor windings of a generator to the exciter diodes comprises the steps of mounting two annular bus rings having three pads each on a dielectric hub; aligning three pads of each annular bus rings at 60° to each other to generate a pattern of six pads each on a 60° spacing and main leads at 90° spacing to each other for connecting to the main generator leads; electrically connecting three pads of the first annular bus rings to three anode diodes and connecting three pads of second annular bus rings to the cathode diodes and connecting two leads of the annular bus ring assembly with main leads on the generator.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discusses above or may only address one of the problems discusses above. Further, one or more of the problems discussed above may not be fully addresses by any of the features discusses below.

The present invention generally provides an annular bus ring assembly for connecting main rotor windings of a generator to the exciter diodes. The annular bus ring may include two annular bus rings mounted on a dielectric hub and pads of the annular bus rings may be clocked on the dielectric hub at 60° spacing to each other and a pattern of two leads at 90° spacing to each other. The dielectric hub may be configured with castellations for supporting the annular bus rings and clocking tabs of annular bus rings and an annular groove for supporting a wire wound resistor and may be insulated by laminations. The braided wire rope leads with a crimp connector at each end may be used to join the connector pad of the annular bus ring assembly with the diodes and helps in mitigating the tolerance stack in diode connection and leads of the annular bus rings may be connected to the main leads of the generator. This is unlike the prior art having full wave bridge connection of complex set of connection linking of six diodes to two main rotor leads that is susceptible to damage from high centrifugal load present on a rotor of generator as well as shorting of the device. The annual ring assembly of the present invention may also be closed in an outer support ring and insulated with laminations and ruggedized by potting. The annular ring assembly allows the generator to withstand the high centrifugal force loading present on rotor. The annular ring assembly can be tested before inclusion on the rotor and can be assembled outside before installation.

Figure 1:
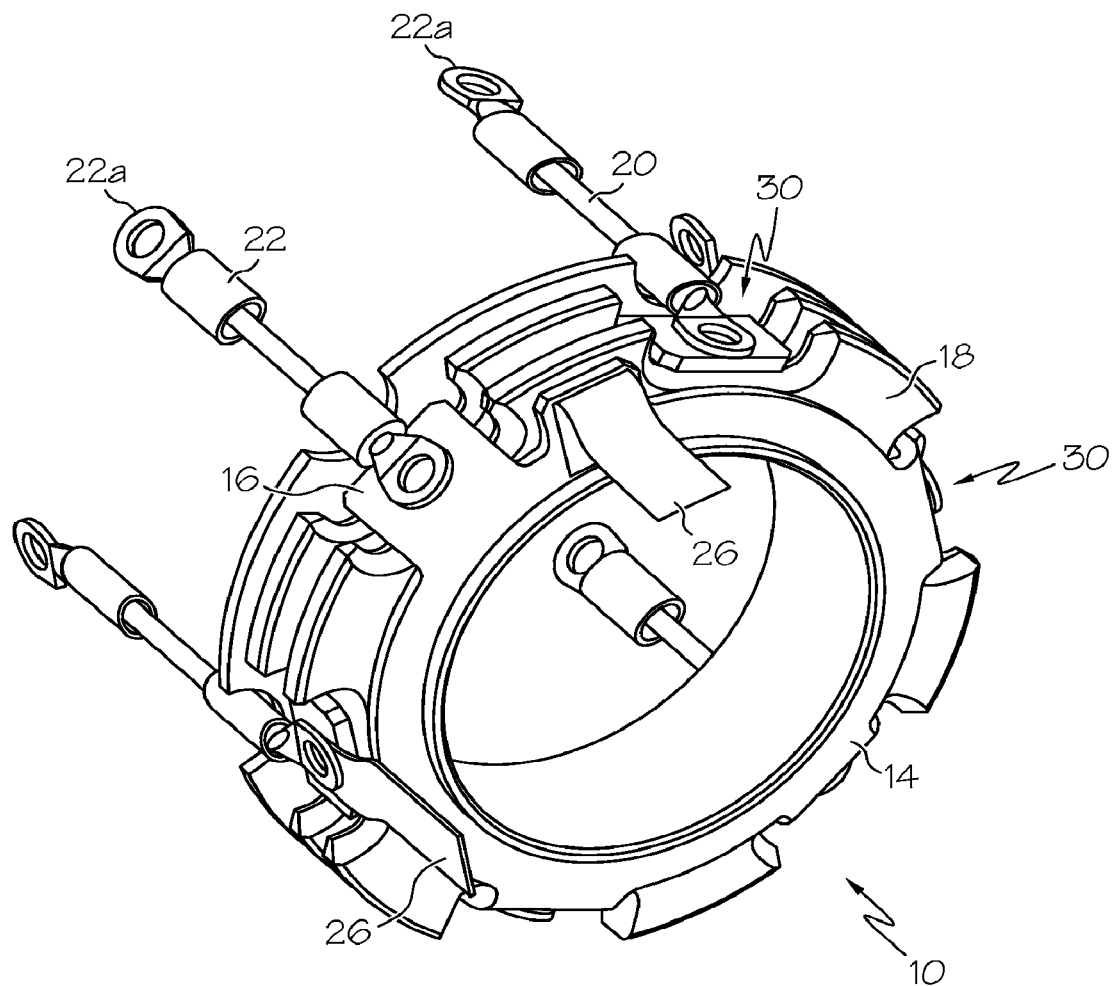
FIG. 1 is a perspective top view of annular bus ring assembly according to an embodiment of the present invention.

Referring to FIG. 1, first and second annular bus rings 14, having tabs bent over forming pads 16, each may be mounted on either side of a dielectric hub 18. Pads 16 of first annular bus ring 14 may be aligned at 60° relative to pads 16 of the second annular bus ring, generating a pattern of six pads on 60° spacing relative to each other and a pattern of two leads 26 at 90° spacing relative to each other. The pads 16 of the annular bus rinds 14 may fit into indentations or castellations 30 in the dielectric hub 18. Electrical leads, such as braided wire rope leads 20, may have a crimp connector 22 at each end. A ring terminal 22a of the crimp connector 22 may connect one end of braided wire rope lead 20 to a diode (not shown) and another end of the braided wire rope lead 20 may be brazed with the connector pad 16 of the annular bus ring 14.

Figure 2:
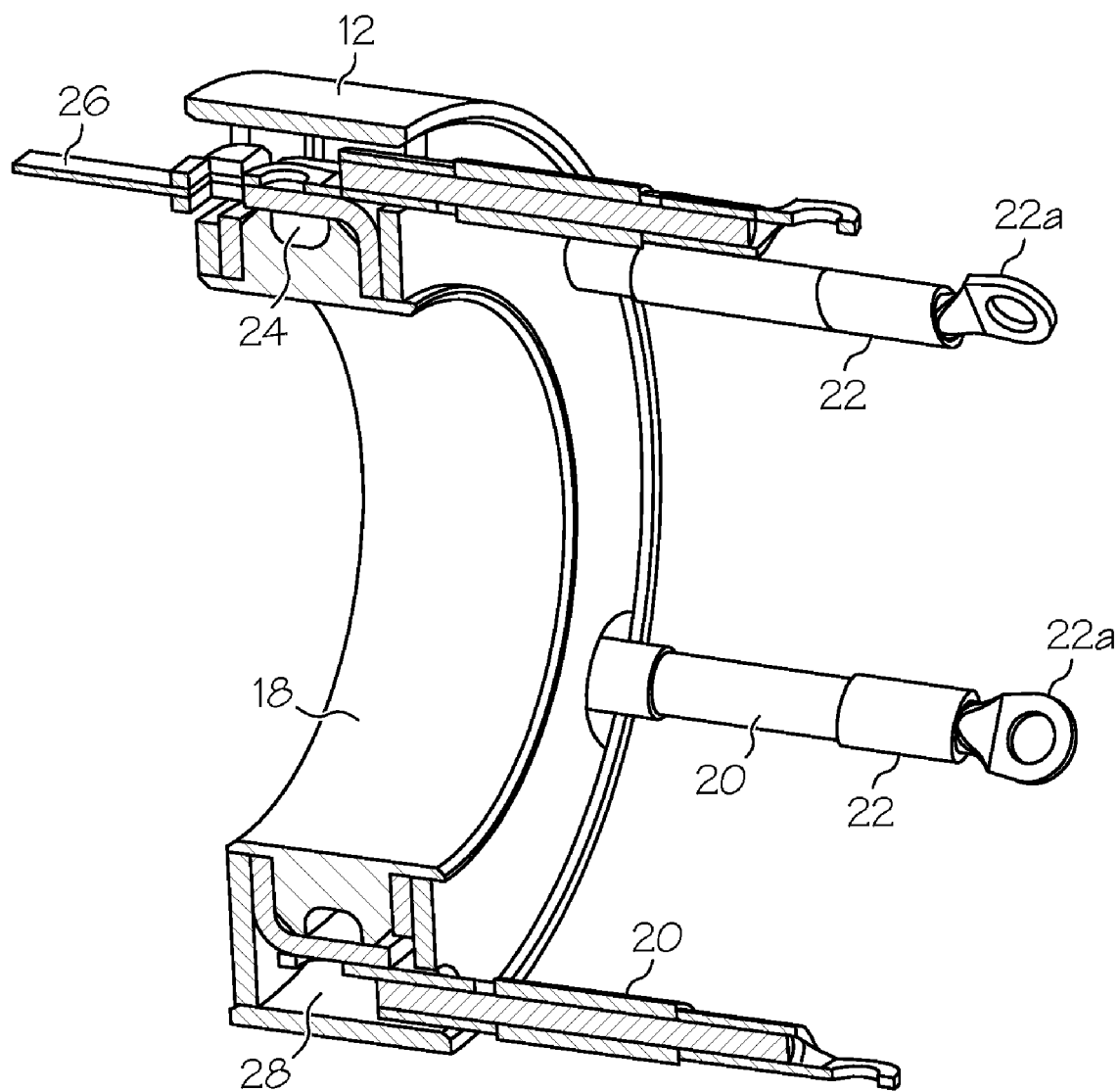
FIG. 2 is a cross sectional view of the annular bus ring assembly shown in FIG. 1.

Referring to FIG. 2, there is shown a cross sectional view of the annular bus ring assembly 10 shown in FIG. 1. The dielectric hub 18 may be laminated for insulation. The dielectric hub 18 may have an annular groove 24 for supporting wire wound resistor. The annular bus ring assembly 10, comprising first and second annular bus rings 14 mounted on the dielectric hub 18, may also be closed in an outer support ring 12. Voids 28 present in the annular bus ring assembly 10 may be ruggedized by potting with epoxy. Braided wire rope leads 20 may have crimp connector 22 at each end. The ring terminal 22a of the crimp connector 22 may connect one end of braided wire top lead 20 to a diode (not shown) and another end of the braided wire rope leads 20 may be brazed with the connector pad 16 of the annular bus ring 14.

Figure 3:
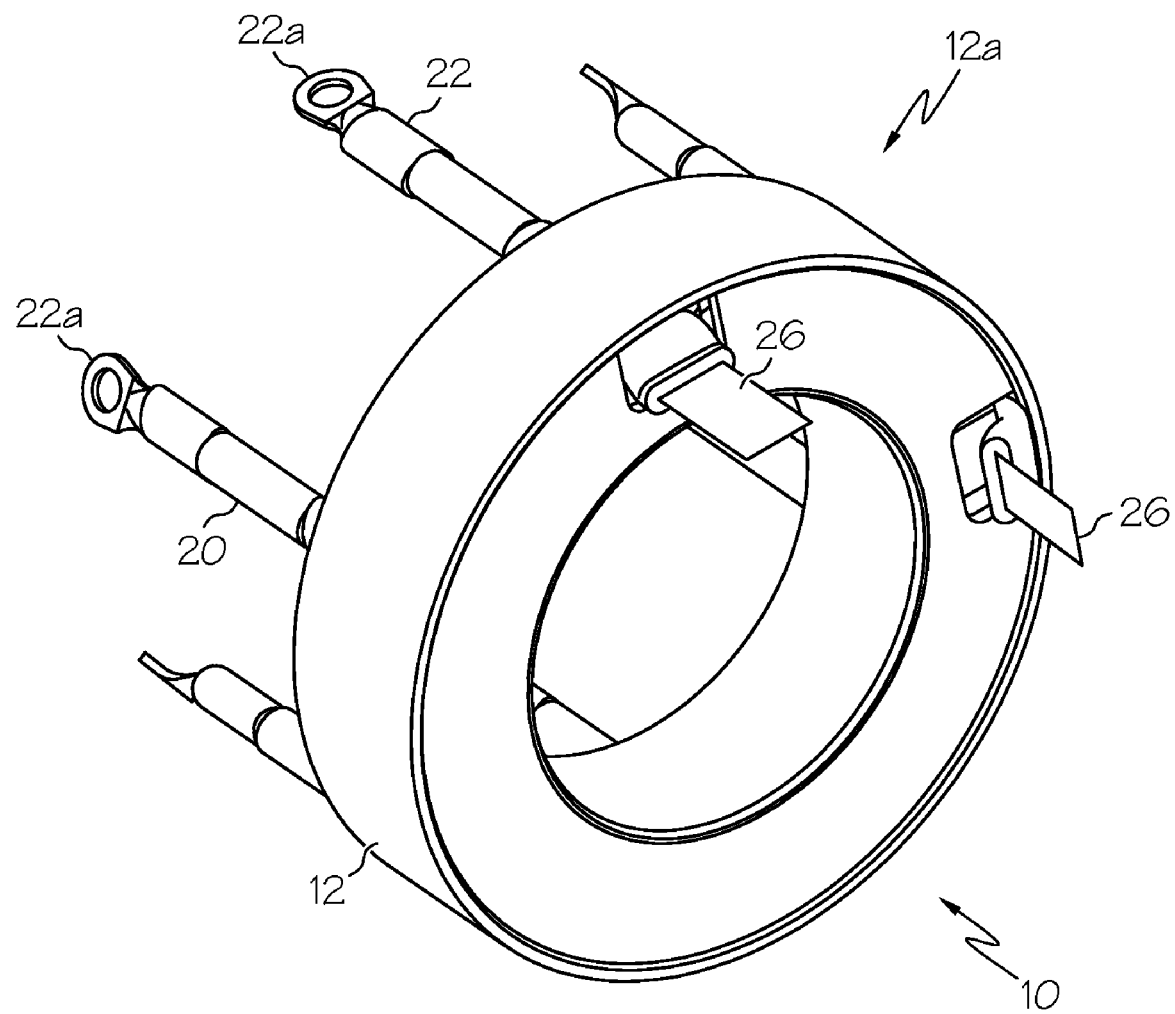
FIG. 3 is a perspective top view of the annular bus ring assembly with insulating lamination shown in FIG. 1.

Referring to FIG. 3, there is shown a perspective top view of the annular bus ring assembly 10, with insulating lamination, as shown in FIG. 1. The annular bus ring assembly 10, having first and second annular bus rings 14 mounted on the dielectric hub 18, may be enclosed in an outer support ring 12 with laminated insulation 12a and two leads 26 at 90° spacing for connection to a main load of a generator (not shown). Braided wire rope leads 20 may have crimp connector 22 at each end. The ring terminal 22a of the crimp connector 22 may connect one end of braided wire top lead 20 to a diode (not shown) and another end of the braided wire rope leads 20 may be brazed with the connector pad 16 of the annular bus ring 14.

Figure 4:
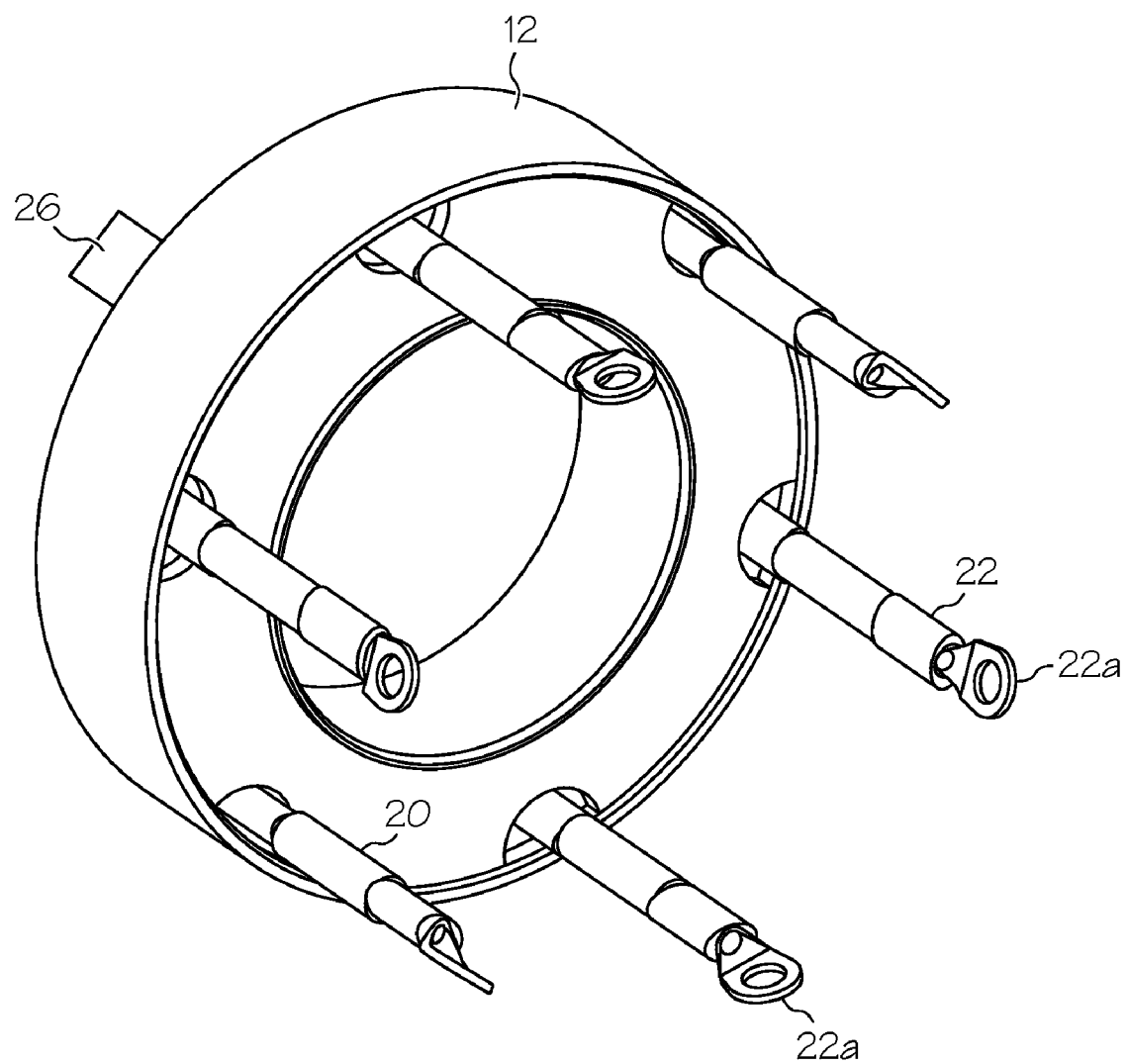
FIG. 4 is a perspective bottom view of the annular bus ring assembly with insulating lamination shown in FIG. 3.

Referring to FIG. 4, there is shown a perspective bottom view of the annular bus ring assembly 10, with insulating lamination, as shown in FIG. 1. The annular bus ring assembly 10, comprising first and second annular bus rings 14 mounted on the dielectric hub 18, may be enclosed in an outer support ring 12 with laminated insulation and two leads 26 at 90° spacing for connection to the main load of a generator (not shown). Braided wire rope leads 20 may have a crimp connector 22 at each end and ring terminal 22a of the crimp connector 22 may connect one end of braided wire top lead 20 to diode and another end of the braided wire rope leads 20 may be brazed with the connector pad 16 of the annular bus ring 14.

Figure 5:
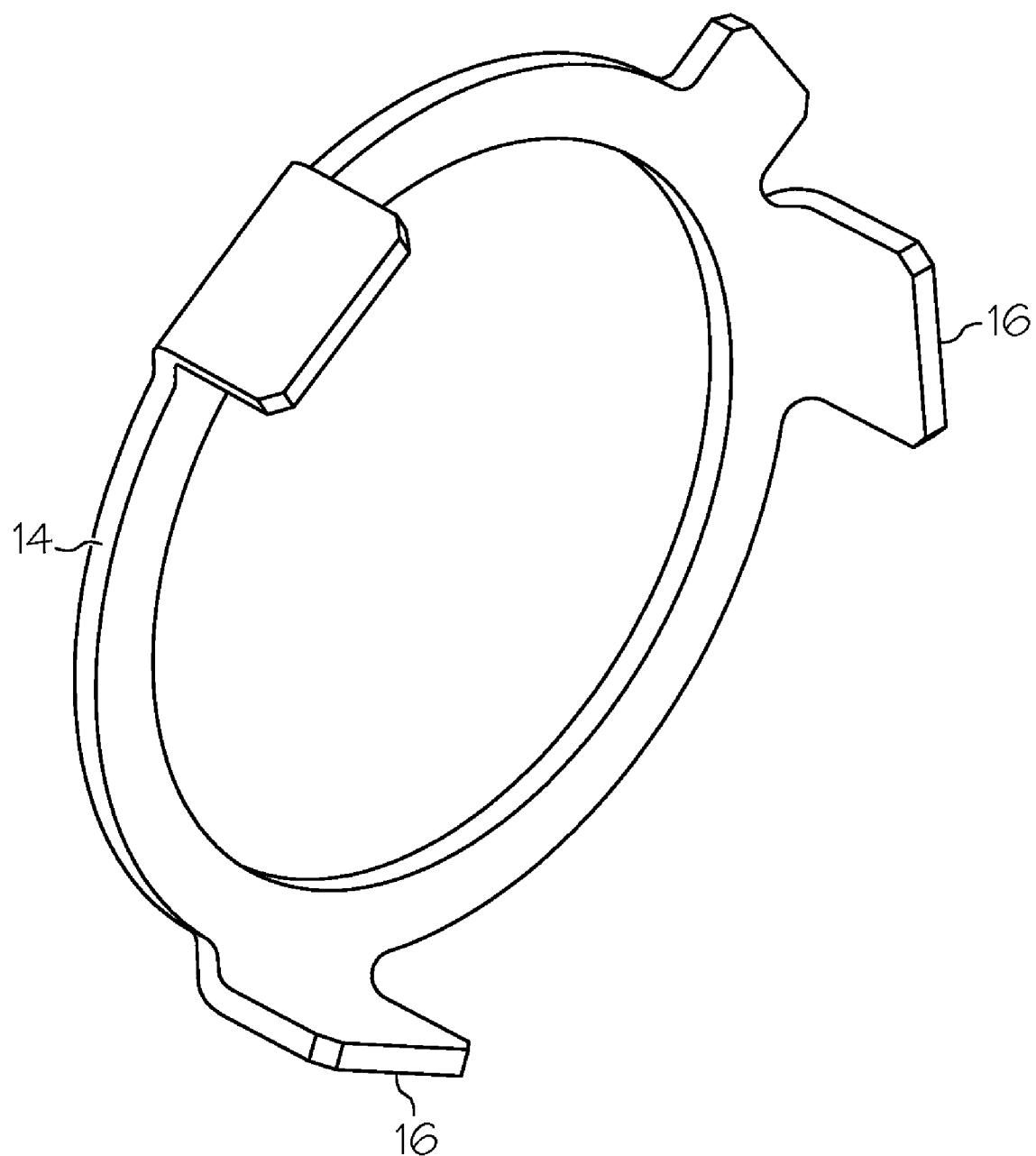
FIG. 5 is perspective top view of the annular bus ring according to an embodiment of the present invention.

Referring to FIG. 5, tabs of an annular bus ring 14 may be bent over forming three pads 16 for aligning and mounting on the dielectric hub 18 of the annular bus ring assembly.

Figure 6:
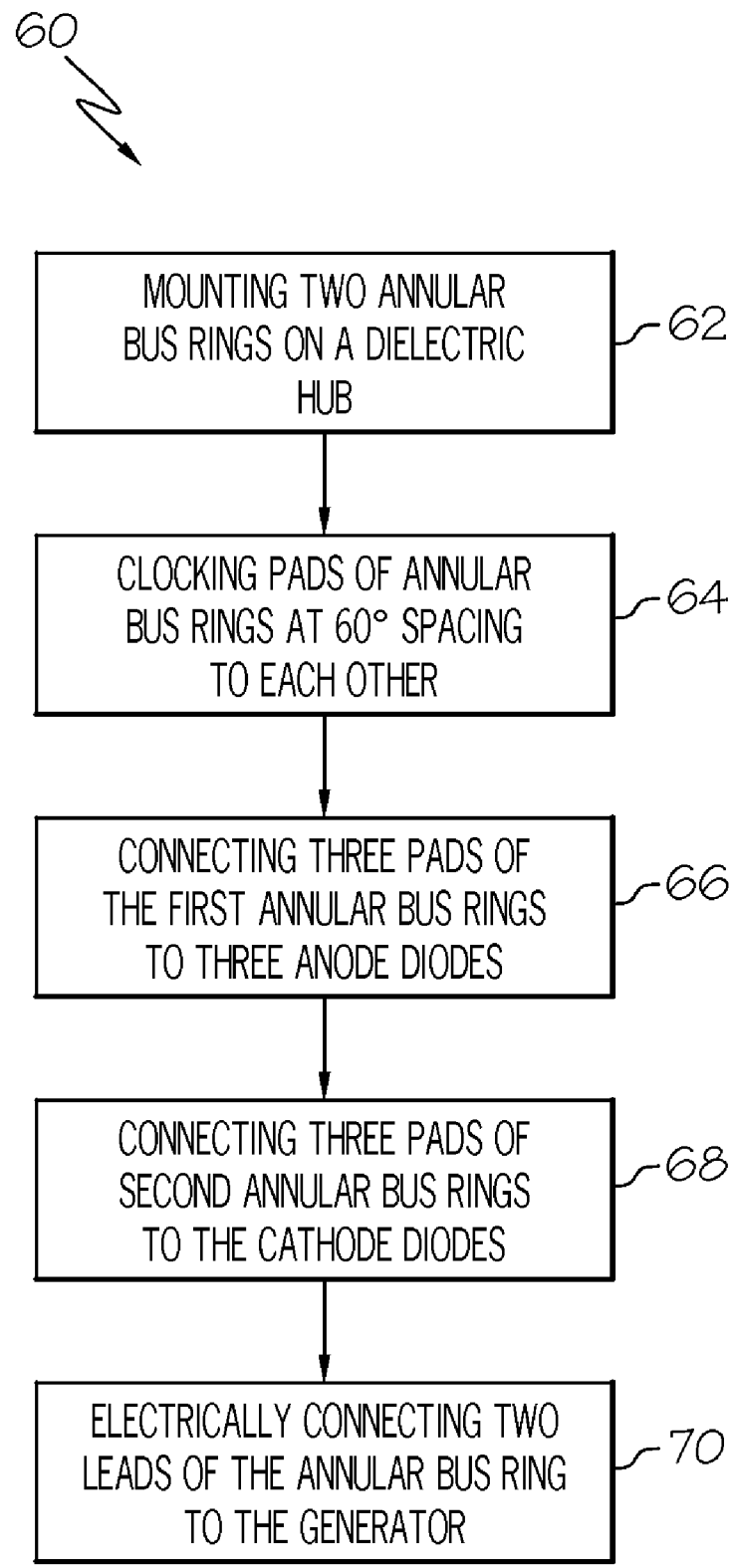
FIG. 6 is the flowchart of method of connecting main rotor windings of a generator to the exciter diodes according to the present invention.

Referring to FIG. 6, a flow chart of a method 60 of connecting main rotor windings of a generator to the exciter diodes. First and second annular bus rings 14 may be mounted on the dielectric hub 18 in step 62. Pads 16 of the annular bus rings 14 may be clocked at 60° spacing to each other in step 64. In steps 66 and 68, three pads of the first annular bus ring may be electrically connected to the anode diodes and three pads of the second annular bus ring may be electrically connected to cathode diodes. In step 70, two leads of the annular bus ring assembly 10 may be connected to the generator to complete the connection.

As can be appreciated by those skilled in the art, the present invention provides a power generating system having an annular bus ring assembly and method for connecting main rotor windings of a generator to the exciter diodes. By such integration, the present invention allows the rotor of generator as well as connection from exciter rotor to generator rotor to withstand the high centrifugal force loading present on rotor and also prevents shorting of the device. The annular bus ring assembly can be tested before inclusion in rotor and can be assembled outside Thus, the need for reworking or scrapping the device is eliminated.

It should be understood, of course, that the foregoing relates to exemplary embodiments of the invention and that modifications may be made without departing from the spirit and scope of the invention as set forth in the following claims.

We claim:

1. An annular bus ring assembly for connecting main rotor windings of a generator to exciter diodes comprising:
   a plurality of annular bus rings;
   a plurality of leads connecting the annular bus rings to respective ones of the exciter diodes; and
   a dielectric hub having castellations supporting the plurality of annular bus rings, the castellations aligning with the annular bus rings pads;
   wherein said annular bus rings, with tabs bent over forming a plurality of pads, are mounted on the dielectric hub, and pads of said annular bus rings are spaced apart on the dielectric hub at an equal angle to each other, and two of the plurality of leads are spaced 90° from each other relative to an axis passing through centers of at least two of the plurality of annular bus rings.

2. The annular bus ring assembly of claim 1, wherein the plurality of annular bus rings includes only two annular bus rings.

3. The annular bus ring assembly of claim 1, wherein the plurality of pads in each annular bus ring is three pads.

4. The annular bus ring assembly of claim 3, wherein the pads of the annular bus ring are spaced at 60° from each other relative to an axis passing through centers of at least two of the plurality of annular bus rings.

5. The annular bus ring assembly of claim 3, wherein three pads of a first annular bus ring of the plurality of annular bus rings are respectively connected to three anode diodes, and three pads of a second annular bus ring of the plurality of annular bus rings are respectively connected to three cathode diodes and two of the leads are connected to the main leads of the generator.

6. The annular bus ring assembly of claim 1, wherein the plurality of leads are braided wire rope leads.

7. The annular bus ring assembly of claim 6, wherein the braided wire rope leads have a crimp connector at each end.

8. The annular bus ring assembly of claim 7, wherein the crimp connector at one end of the braided wire rope leads is a ring terminal.

9. The annular bus ring assembly of claim 1, wherein the dielectric hub is configured with an annular groove for supporting a wire wound resistor.

10. A power generating system, comprising:
    an outer supporting ring enclosing an annular bus ring assembly;
    the annular bus ring assembly connecting main rotor windings of a generator to exciter diodes and having a dielectric hub configured with castellations to support a plurality of annular bus rings with tabs bent over forming a plurality of tabs;
    the annular bus rings mounted on the dielectric hub, pads of the annular bus rings aligned about the dielectric hub at an equal angle spacing to each other, and two leads, connecting to a main generator lead, are spaced at 90° to each other;
    three anode diodes connected to plurality of pads of one or more annular bus rings; and
    three cathode diodes connected to the plurality of pads of the one or more annular bus rings by a plurality of braided wire rope leads.

11. A method of connecting main rotor windings of a generator to exciter diodes, the method comprising:
    mounting two annular bus rings having three pads each on a dielectric hub;
    aligning three pads of each annular bus rings at 60° to each other to generate a pattern of six pads each on a 60° spacing and main leads at 90° spacing to each other for connecting to the main generator leads;
    electrically connecting three pads of the first annular bus rings to three anode diodes and connecting three pads of second annular bus rings to the cathode diodes;
    connecting two leads of the annular bus ring assembly with main leads on the generator.

12. The method of claim 11, further comprising configuring the dielectric hub with castellations for supporting and aligning the annular bus rings tabs.

13. The method of claim 11, further comprising configuring the dielectric hub with an annular groove for supporting a wire wound resistor.

14. The method of claim 11, further comprising laminating the dielectric hub for insulation.

15. The method of claim 11, wherein pads of the annular rings are formed by bending over the tabs of the annular bus rings.

16. The method of claim 11, wherein wire rope leads connect the rotor with the diodes.

17. The method of claim 16, further comprising braiding the wire rope leads connecting the rotor with the exciter diodes.

18. The method of claim 17, further comprising brazing another end of braided wire rope leads to the connector tab of annular bus ring.

19. The method of claim 11, further comprising closing the annular bus ring assembly in an outer support ring.

20. The method of claim 11, further compromising ruggedizing the annular bus ring assembly and outer support ring by potting the voids with epoxy.

* * * * *